United States Patent

Richard

Patent Number: 5,300,131
Date of Patent: Apr. 5, 1994

[54] COMPACT SCRUBBER

[76] Inventor: Donald E. Richard, Rte. 3, Box 205A, Rockport, Ind. 47635

[21] Appl. No.: 867,360

[22] Filed: Apr. 13, 1992

[51] Int. Cl.5 .............................................. B01D 47/00
[52] U.S. Cl. ....................................... 55/233; 55/257.2
[58] Field of Search ........................ 55/233, 257.2, 440

[56] References Cited

U.S. PATENT DOCUMENTS

| | | | |
|---|---|---|---|
| 1,700,126 | 1/1929 | Goodloe | 55/97 |
| 2,027,906 | 1/1936 | Hand | 183/44 |
| 2,327,184 | 8/1943 | Goodloe | 183/69 |
| 3,280,542 | 10/1966 | Heijnis | 55/485 |
| 3,538,657 | 11/1970 | Macrow | 3/4 |
| 3,628,311 | 12/1971 | Costarella et al. | 47/6 |
| 3,648,440 | 3/1972 | Egan | 47/00 |
| 3,659,402 | 5/1972 | Alliger | 47/6 |
| 3,870,082 | 3/1975 | Holl | 1/2 |
| 3,880,626 | 4/1975 | Griwatz et al. | 39/10 |
| 3,957,464 | 5/1976 | Teller | 42/12 |
| 4,175,933 | 11/1979 | James | |
| 4,229,386 | 10/1980 | Lerner | 3/4 |
| 4,249,778 | 2/1981 | McGuire | 55/257.2 |
| 4,380,353 | 4/1983 | Campbell et al. | 55/233 |
| 4,787,920 | 11/1988 | Richard | 53/14 |

Primary Examiner—Charles Hart
Attorney, Agent, or Firm—Edward H. Renner

[57] ABSTRACT

A small modular portable flooded bed scrubber suitable for installation in confined areas is disclosed. The scrubber may be formed in a plurality of modular units, such as two or three units, and requires of minimum of accessory devices. The scrubber effluent can be removed by gravity. The pressure drop across the scrubber is low and the air velocity is sufficiently low that fan stalling and ambient noise are greatly reduced. A collector structure collects water droplets and prevents bypass of air and droplets around the entrainment module and prevents leakage at the joinery of the modules.

5 Claims, 3 Drawing Sheets

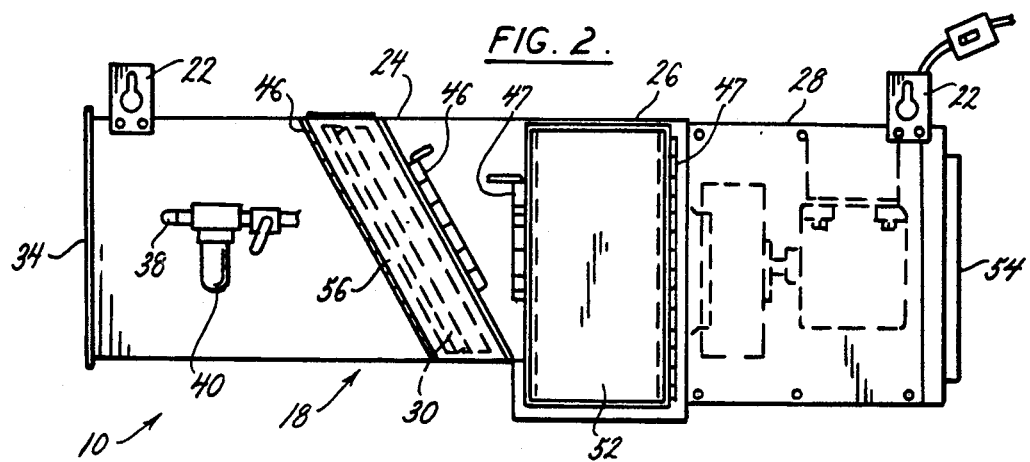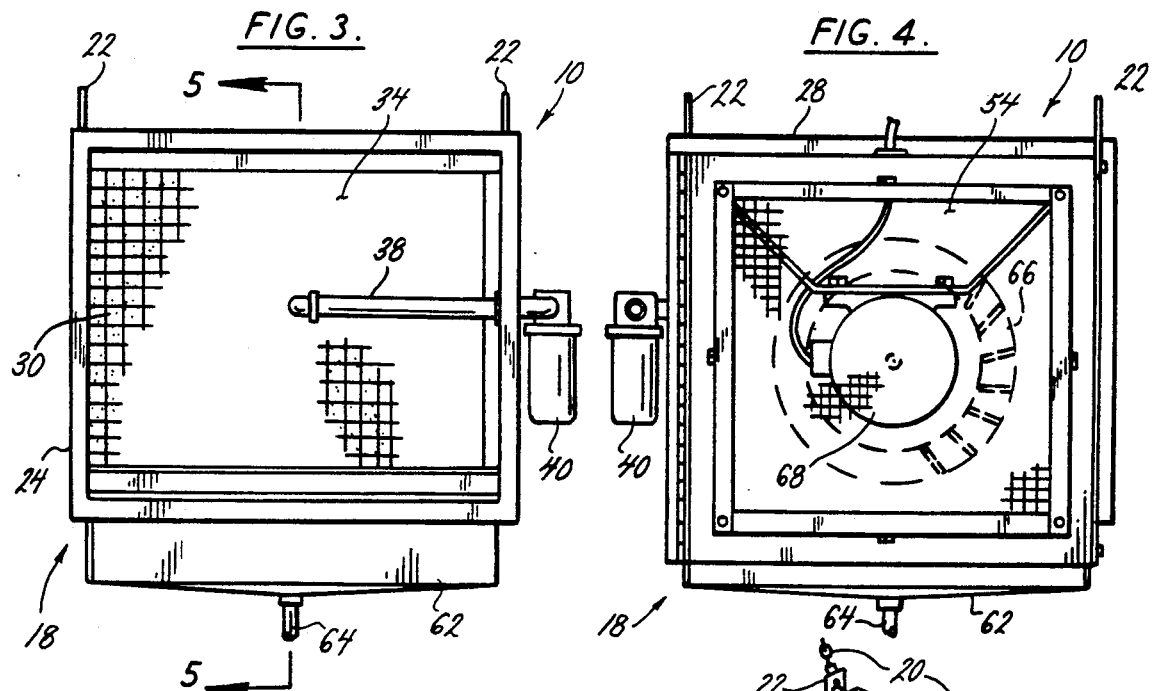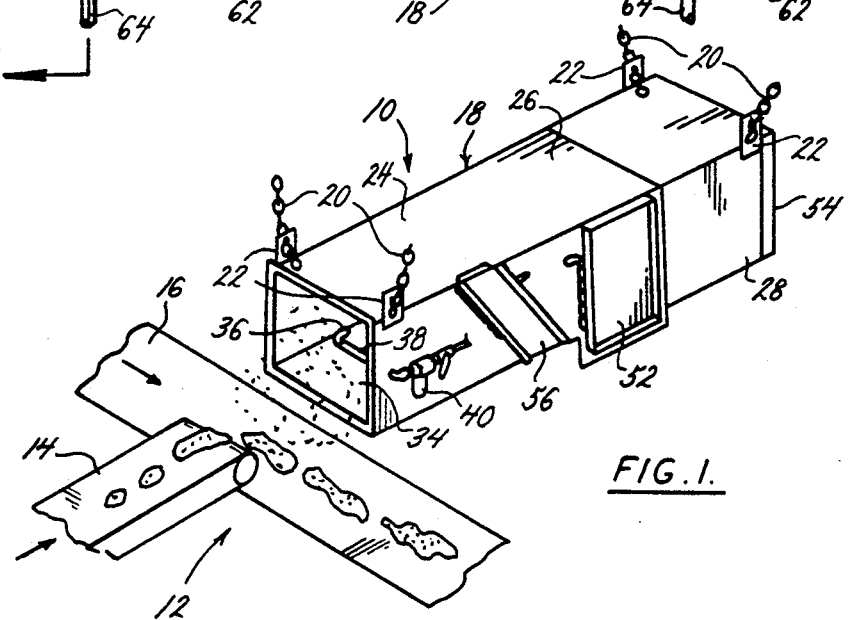

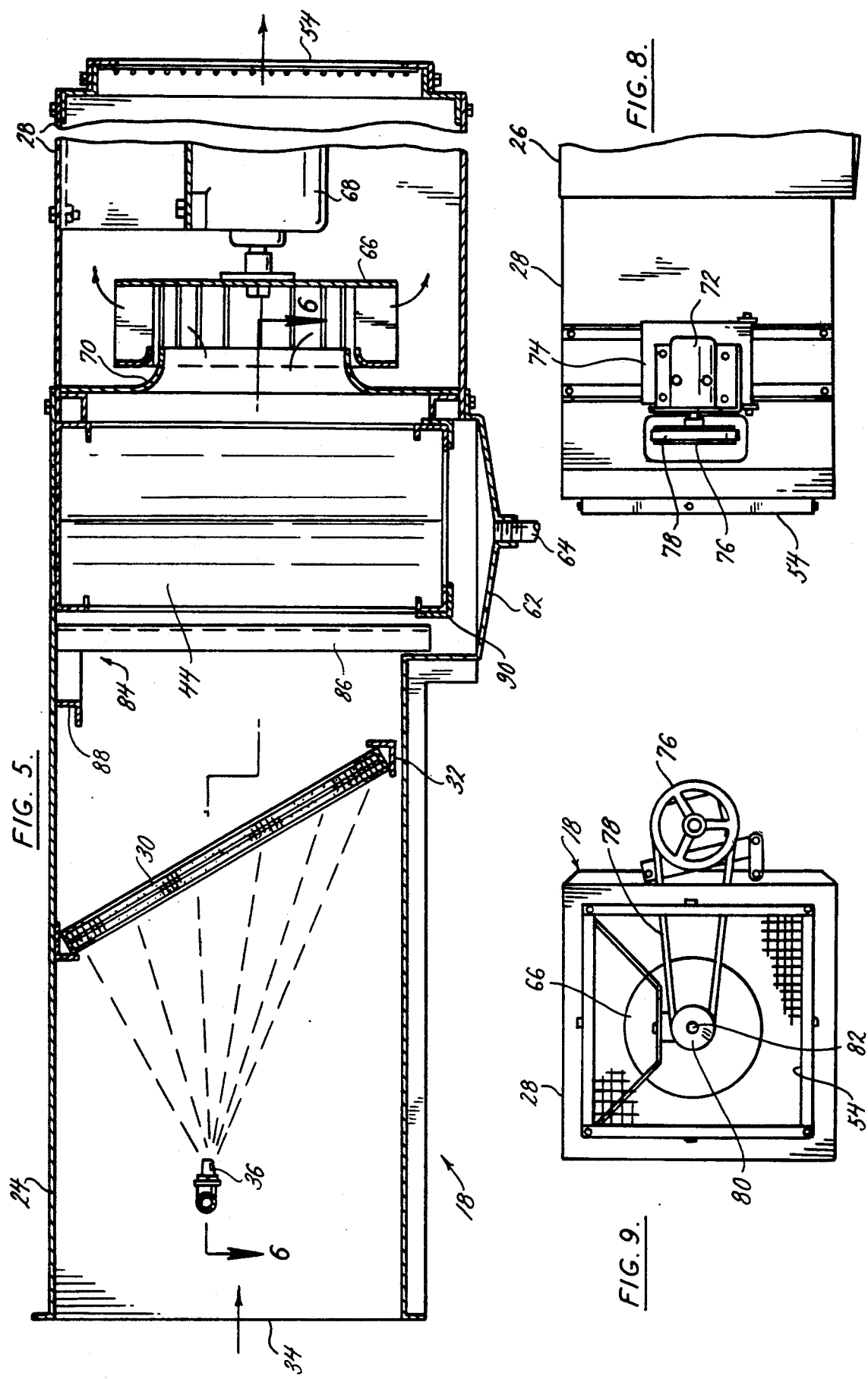

COMPACT SCRUBBER

BACKGROUND AND SUMMARY OF THE INVENTION

The elimination or the minimization of contaminants, such as dust, in the air at a mining site, as in underground coal-mining, has a considerable health significance for the workers in that environment. Large stationary devices typically, such as the device disclosed in my U.S. Pat. No. 4,787,920, are required to eliminate or reduce dust concentrations in mines. These devices are typically incorporated as part of larger equipment, such as continuous mining devices. These devices for removing dust are, usually, of the type known as flooded bed scrubbers.

The conventional flooded bed scrubber has complicated and heavy duct work and shrouding, and has large, heavy inlet spray arrangements, fans, motors and other mechanical components. These devices are operable in mines at many areas generating high dust concentrations, for example at the mining face. However, there is a need for much smaller, more compact, portable and semi-portable devices which can be used at a variety of other locations which generate high dust concentrations, but which are not susceptible to the use or installation of large stationary scrubbing devices, due to the limitations on space.

I am aware of the following U.S. Pat. Nos. 1,700,126, 2,027,906, 3,538,657, 3,957,464, 4,175,933, 4,229,386, and 4,787,920 the disclosures of which are incorporated by reference herein.

Consequently, I have developed a unique, portable flooded bed scrubber and filter system which is adaptable for small scale machinery. The scrubber system may be used at locations in which space is at a premium. The scrubber is effective to remove air contamination, such as high dust concentrates, and to minimize the effect of dust generation in the working environment. The device is a small scale flooded bed scrubber which can be assembled and disassembled readily and which can be installed in the working environment in a variety of locations and configurations. The scrubber can use a filter screen of the type disclosed in my previous U.S. Pat. No. 4,787,920 and can use other filtration media, such as metallic screening. The scrubber utilizes a downstream fan configuration and can be sized to utilize an air flow of approximately two thousand cubic feet per minute across the filter at about 0.6 inches water pressure drop, in a small plenum, for example. The device is of a modular configuration typically having a fan module, a demister module and a flooded bed module with included entrainment baffles, as described further herein. These modules can be dismantled, moved about and assembled or reassembled at a variety of locations and mounting configurations. In addition, I have devised a method for preventing blow by and leakage of air and water around the modules, particularly in the entrainment area, so that it is not necessary to provide an airtight or pressure tight seal at the joints of the modules of the device.

It is thus an object of the invention to prepare a small, compact and lightweight flooded bed scrubber which can be used in confined areas where high dust concentrations are generated.

It is an object of the invention to produce a small modular flooded bed scrubber which can be readily assembed and disassembled and transported.

It is an object of this invention to provide a small modular flooded bed scrubber which does not require complex sealing means between the modules of the scrubber.

It is a further object of the invention to provide a modular scrubber having droplet collection means to prevent blowby of moisture around the entrainment area of the scrubber and to prevent leakage at the joints of the modules of the scrubber.

It is a further object of the invention to provide a small flooded bed scrubber which requires a minimum of auxiliary devices.

It is a further object of the invention to provide a flooded bed scrubber for installation in confined areas which does not require pumpage or auxiliary devices to evacuate the sump.

It is a further object of this invention to provide a compact flooded bed scrubber which can be installed in areas having minimal available space and which does not produce high ambient sound levels.

Further objects and understanding of the present invention will become more apparent from the following description taken in conjunction with the accompanying drawings.

DESCRIPTION OF THE DRAWINGS

FIG. 1 is a perspective view of a scrubber according to the invention installed in a work environment.

FIG. 2 is a partially broken side view of the scrubber device.

FIG. 3 is a left end view looking into the interior of the scrubber.

FIG. 4 is a right end view looking into the interior of the scrubber.

FIG. 5 is a side cross-sectional view of the scrubber taken along the line 5—5 in FIG. 3.

FIG. 8 is a partial broken view showing a second embodiment of the scrubber.

FIG. 9 is a left end view of the scrubber shown in FIG. 8.

DETAILED DESCRIPTION OF THE PREFERRED EMBODIMENT

Figure 6:
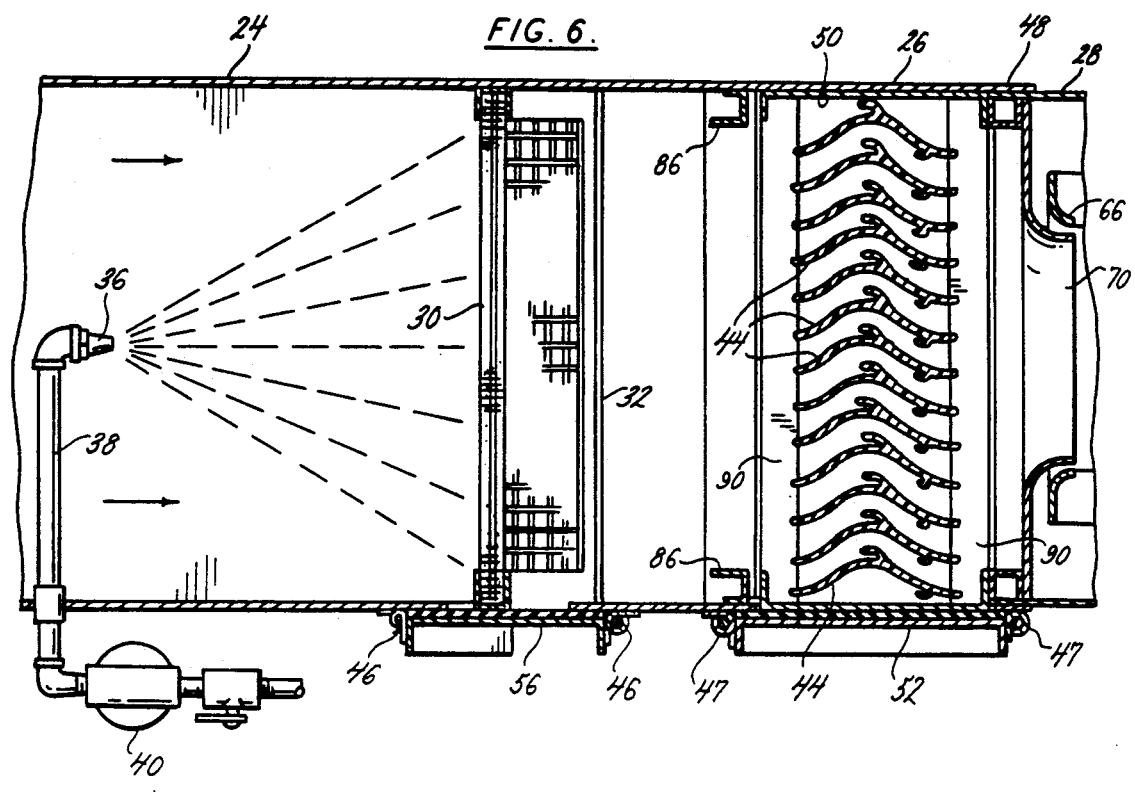
FIG. 6 is a partial top cross-sectional view of the scrubber taken along line 6—6 in FIG. 5.

For the purposes of promoting an understanding of the principles of the invention reference will now be made to the embodiment illustrated in the drawings and specific language will be used to describe the same. It will neverless be understood that no limitation to the scope of the invention is intended. Such alternatives and further modifications in the illustrated device and such further applications of the principles of the invention, as illustrated herein, being contemplated as would normally occur to one skilled in the art to which the invention relates.

Referring now to FIG. 1, the scrubber 10 is shown as installed in a work place environment at the conjunction 12 of coal transfer belts 14 and 16 at which mined coal is transferred from one moving belt 14 to the other belt 16 in a manner to generate a large quantity of dust. The scrubber 10 generally includes a housing 18 which is shown as mounted from a mine roof, not shown, by chains 20 which are engaged in chain eyelets 22, as shown in FIGS. 1 and 2. It will be understood that alternative mounting methods, such as framing stands or bases, not shown, can also be used. Further, as shown in FIG. 2, the scrubber 10 and housing 18 are divided into three sections or modules, 24, 26 and 28. As shown, sections 24 and 26 are unitary. However, sections 24 and 26 may also be formed as separate modules. Scrubber module 24 includes an inclined filter 30 and filter mount 32, as shown, module 24 also includes an air and dust inlet 34, as shown at the left in FIG. 2. Also included within module 24 is a water spray nozzle 36 which connects via a pipe 38 and filter 40, shown in FIG. 3, to a conventional water source, not shown. Scrubber module 24, if separate, may be connected by removable flanged connections, not shown, to the middle module 26. It will also be further understood that the inlet 34 and outlet 54 of scrubber 10 may be connected to ductwork, either rigid or flexible, to provide a remote intake and exhaust of dust and air, not shown.

Scrubber module 26 houses entrainment baffles 44 whose operation is described further herein. Module 26 is also joined by a removable connection to fan module 28. The connections between modules 24, 26 and 28 may be accomplished by flanges, not shown, which may be joined by conventional removable fasteners, not shown. It being understood that cooperating flanges, not shown, may be provided on each of the separate modules 24, 26 and 28. The modules 24, 26 and 28 of the housing 18 may also be made to interfit by telescoping, for example, as shown in FIG. 6 at 48 and 50. As shown in FIG. 6, the scrubber housing 18 may also be provided with a removable door 52, which is shown in center section 26. Module 24 of scrubber 10 is also provided with an access door 56 which allows replacement of filters 30 for regular maintenance and for repair. Access door 56 is received in flanges 46, as shown. Removable door 52 is likewise received in an additional set of flanges 47, as shown. Doors 52 and 56 may be held to flanges 46 and 47 by removable fasteners, such as screws, bolts or clamps, not shown.

Figure 7:
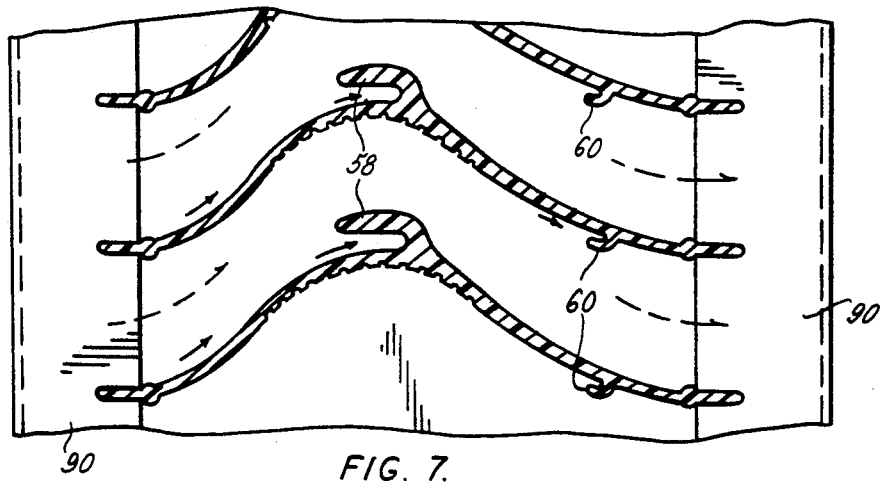
FIG. 7 is a partial cross-sectional view showing the entrainment baffles in greater detail.

Section 26 has a set of entrainment baffles 44. Entrainment baffles 44 are shown in more detail in FIG. 7 in top cross-section. Entrainment baffles 44 extend vertically across the cross-sectional area of module 26 of scrubber 10 and, as shown in FIGS. 6 and 7, provide a labyrinthian pathway for the water spray passing through scrubber 10. Entrainment baffles 44 have an additional projecting portion 58, as shown, and a further smaller projecting portion 60, as shown. Portions 58 and 60 act to provide additional turbulence which assists in removing entrained water droplets from the air stream passing through scrubber 10. Module 26 further has a sump 62 at its bottom for collecting the water removed from the air stream by entrainment baffles 44 as well as water which accumulates on filter 30 and then percolates downward into the bottom of scrubber 10. Sump 62 is provided with an outlet 64 which may be connected to a line, not shown, for the removal of the accumulated water. Section 28 of scrubber 10 is the outlet section and has an outlet 54 to permit the cleaned air to exit from the scrubber 10. Section 28 includes a fan 66 shown as a conventional squirrel cage blower-type fan. Fan 66 is driven by an electric motor 68, which may be connected to a conventional power line, not shown. Shrouding 70 guides the flow of air into fan 66 in a smooth and efficient manner. As shown in FIG. 5, motor 66 is mounted inside the housing 18 of module 28. An alternative to this mounting structure is shown in FIGS. 8 and 9. A hydraulic motor 72 may be mounted on a platform 74 attached to the outside of housing 18 of module 28. Motor 72 is equipped with a sheave 76 which is connected to drive belt 78, which passes through housing 18 and drives sheave 80 connected by a suitable shaft 82 to a fan 66, as shown.

Section 26 of scrubber 10 is also equipped with a collector ring 84 formed of a series of channels or gutters, such as vertical channels 86 and horizontal channel 88, as shown. The purpose and operation of these collector channels is described further herein.

The configuration thus described permits the manufacturer of a highly compact, light-weight, efficient and portable flooded bed scrubber 10 which may be used in a variety of locations where space is at a premium, for example in an underground mine. The scrubber 10 is highly efficient at removing dust concentrations from air in the workplace. For example, it is possible to manufacturer an efficient device which is approximately six feet in length and which has a cross-section of about two feet by two feet or less. Such a device weighs only about 225-250 pounds and may be easily disassembled into its component modules and moved and transported. Typically, even when joined into a complete scrubber unit, the entire device can be conveniently moved by two people. A device of this type, for example having a squirrel cage fan 10-16 inches in diameter, can easily process and clean from 2000 to 4000 cubic feet of air per minute. The pressure drop across the device typically is only from one half to one p.s.i. The low pressure drop is a great advantage since this permits the entrained water which is collected in the sump to be removed by gravity, thus eliminating the need for additional pumps to transport the removed water. The drain 64 typically is formed of standard $\frac{1}{2}$ inch pipe. The small area of the pipe prevents air from bypassing the screen 30 via drain 64. The low pressure drop also reduces fan stalling and noise in the workplace. The power requirements for scrubber 10 are quite minimal; typically the fan may be driven by a small motor, such as a stall proof electric motor having from about $\frac{1}{2}$ to 2 horsepower, or a hydraulic or other equivalent motor.

OPERATION OF THE DEVICE

Operation of the scrubber 10 may be further understood by referring to FIG. 5. As shown in FIG. 5, air enters inlet 34 under the influence of the pressure drop created by fan 66. The air entering inlet 34 contains a high concentration of dust typically as generated in a high dust mining area. As the dust-containing air passes through module 24, a water spray is pumped through nozzle 36 under a pressure of between about 60 to 150 p.s.i. provided by a pump, not shown. Water from nozzle 36 is sprayed on filter screen 30 to coat filter screen 30 with water. The air and dust pass through filter screen 30 where the dust is removed by being wetted and plated out onto the screen 30. The dust is washed from screen 30 by the application of water to screen 30 and flows as a slurry into sump 62. A minimal amount of water is required to remove high dust concentrations, for example, only one half to one gallon per minute is normally sufficient. Air continues through screen 30 and carries with it some of the water introduced to screen 30 as entrained droplets. The remaining portion of the water percolates down screen 30 to the bottom portion of housing module 24 and flows into sump 62, as described. The air containing entrained water droplets impinges upon the entrainment baffles 44 which are held in an array in module 26 by a suitable framework 90, as shown in FIGS. 5 and 6. The entrained water droplets coalesce on the entrainment baffles 44 and flow downwardly along baffles 44 into sump 62. The air, freed of the entrained water droplets, passes through shroud or air guide 70, through fan 66 in outlet section 24 and through outlet 54 back into the work environment, in a clean condition.

In section 24 as the air containing entrained water exits from screen 30, a certain portion of the water droplets in the air strike the walls of housing 18 and coalesce on the walls of housing 18. The air flow through scrubber 10 pushes the coalesced water along the walls of housing 18 in the direction of air travel through the scrubber 10. In the bottom of the scrubber 10 this collected water flows into sump 62 and does not cause any difficulty. However, if not interrupted or collected, the water flowing along the top and side walls of housing 18 will bypass the entrainment baffles 44 and will leak through the joinery 48, 50 of modules 26 and 28 unless the modules are sealed. I have devised a structure which eliminates the need for sealing the joint between modules 26 and 28 and which eliminates the bypassing of water around entrainment baffles 44 along the walls of housing 18. This structure is a collector ring 84 formed of a series of collector channels or gutters 86 and 88. Gutters and channels 86 line the vertical walls of section 26 and channel 88 lines the top wall of housing 18, as shown. When coalesced water is blown along the inner wall of housing 18, downstream of screen 30, it encounters channel 88 at the top and channels 86 on the sides of housing 18. These channels 86, 88 collect the water and divert it downwardly into sump 62. The use of collector channels 86 and 88 eliminates the need for complicated sealing structure between modules 26 and 28, eliminates the bypass of water around entrainment baffles 44 and permits a simple, readily disconnectable joining structure between modules 26 and 28.

The collected water and dust is discharged as a slurry from sump 62 through drain 64. Discharge may be to atmosphere, such as by discharge onto a material transporting belt, or to a collection system or sewer.

The scrubber arrangement described above is susceptible to various changes within the spirit of the invention. The invention is not to be limited to the specifics of the embodiments disclosed herein for purposes of illustration, but only by the scope of the appended claims and their equivalents.

I claim as my invention:

1. A portable modular flooded bed scrubber for removing dust particles from the surrounding air, the scrubber comprising:
   (a) a housing forming a pathway for dust-containing air through the housing including an inlet means for dust-containing air and outlet means for scrubbed air,
   (b) a filter positioned in the scrubber downstream of the inlet means,
   (c) water spray means for applying water to the filter for scrubbing dust-containing air,
   (d) disentrainment baffle means downstream of the filter means for demisting the scrubbed air,
   (e) means for propelling air through the scrubber and out the outlet for scrubbed air permitting the scrubbed air to exit from the housing,
   (f) a sump means for collecting and discharging scrubbed dust particles and water from the housing,
   (g) means for forming the scrubber in a plurality of modular units which may be easily assembled and disassembled and easily transported and installed in a confined location,
   (h) collector means for preventing the bypass of entrained droplets through the unsealed joinery of adjacent modules of the scrubber without complex sealing means, and
   (i) the collector means including a gutter and a plurality of channels upstream of the disentrainment baffle means to collect droplets of water impinging the walls and top of the scrubber housing, the gutter and channels having means for directing the collected droplets into the sump, the gutter extending horizontally across the interior of the scrubber upper wall and the channels extending vertically along the interior of the scrubber and walls and communicating with the sump, the channels being adjacent to the disentrainment baffle and the gutter being spaced from the disentrainment baffle in the upstream direction.

2. The scrubber of claim 1 wherein the scrubber has two modules.

3. The scrubber of claim 1 wherein the means for propelling air through the scrubber is a fan located downstream of the disentrainment baffle means.

4. The scrubber of claim 3 wherein the fan is in a separate module.

5. The scrubber of claim 1 wherein the water spray means is upstream of the filter.

* * * * *